United States Patent
Ohta et al.

(10) Patent No.: US 7,449,857 B2
(45) Date of Patent: Nov. 11, 2008

(54) SERVO CONTROL DEVICE

(75) Inventors: Seitaro Ohta, Fukuoka (JP); Hiroshi Nakamura, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 143 days.

(21) Appl. No.: 11/658,742

(22) PCT Filed: Jul. 27, 2005

(86) PCT No.: PCT/JP2005/013747

§ 371 (c)(1),
(2), (4) Date: Jan. 29, 2007

(87) PCT Pub. No.: WO2006/011519

PCT Pub. Date: Feb. 2, 2006

(65) Prior Publication Data

US 2008/0036413 A1    Feb. 14, 2008

(30) Foreign Application Priority Data

| Jul. 27, 2004 | (JP) | ............................. 2004-218037 |
| Nov. 29, 2004 | (JP) | ............................. 2004-343773 |
| Apr. 1, 2005 | (JP) | ............................. 2005-106437 |
| Apr. 1, 2005 | (JP) | ............................. 2005-106438 |

(51) Int. Cl.
*G05B 11/01* (2006.01)

(52) U.S. Cl. .................. 318/560; 318/568.22; 318/609; 318/628

(58) Field of Classification Search .................. 318/560, 318/567, 568.22, 609–610, 628, 632
See application file for complete search history.

(56) References Cited

U.S. PATENT DOCUMENTS

| 5,107,193 | A | * | 4/1992 | Iwashita ...................... 318/560 |
| 6,274,994 | B2 | * | 8/2001 | Tsutsui ........................ 318/560 |
| 6,590,358 | B1 | * | 7/2003 | Tsutsui ........................ 318/560 |
| 6,744,233 | B1 | * | 6/2004 | Tsutsui ........................ 318/560 |
| 6,943,522 | B2 | * | 9/2005 | Nagaoka et al. ............. 318/632 |
| 6,949,905 | B2 | * | 9/2005 | Tomatsuri et al. ........... 318/567 |
| 7,030,585 | B2 | * | 4/2006 | Iwashita et al. ............. 318/567 |
| 7,049,775 | B2 | * | 5/2006 | Iwashita et al. ............. 318/566 |

FOREIGN PATENT DOCUMENTS

| JP | 5-181534 | A | 7/1993 |
| JP | 2000-172341 | A | 6/2000 |
| JP | 2002-62906 | A | 2/2002 |
| JP | 2004-213472 | A | 7/2004 |

* cited by examiner

*Primary Examiner*—Bentsu Ro
*Assistant Examiner*—Thai Dinh
(74) *Attorney, Agent, or Firm*—Sughrue Mion, PLLC (57) ABSTRACT

An object of the invention is to provide a servo control device capable of making zero the positional deviation the positional deviation at a constant speed as well as the positional deviation at a constant acceleration or at constant acceleration and jerk, thereby providing a high-precision follow-up response.

In order to solve this problem, the servo control device according to the invention includes a position controller (3) for generating a speed command that matches the motor output with a target position, a feed-forward controller (4) for adding a signal obtained by multiplying the differential of a target command by a gain and a signal obtained by multiplying the second-order differentiation of the target command by a gain and generating a speed feed-forward signal, and a speed controller (2) for performing I-P or PI control of the motor (1).

17 Claims, 4 Drawing Sheets

SERVO CONTROL DEVICE

TECHNICAL FIELD

The present invention relates to a servo control device for driving a machine tool, semiconductor manufacturing equipment, or a mounting device that requires high instruction tracking accuracy.

BACKGROUND ART

Various arrangements are proposed as a servo control device that provides motor output matching a target instruction.

Figure 3:
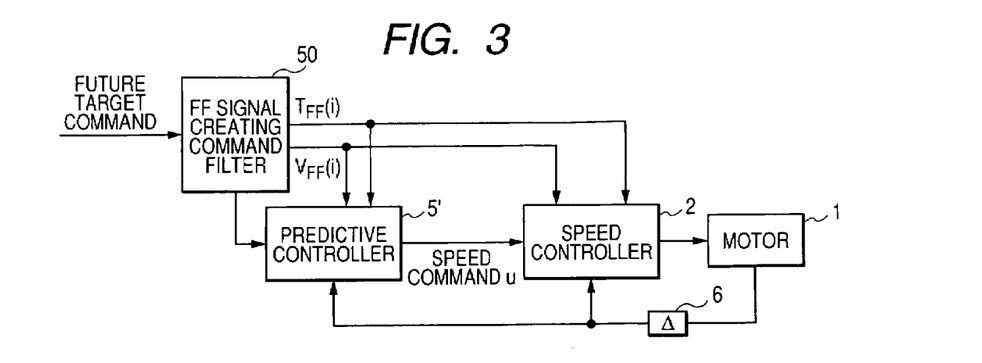
FIG. 3 is a block diagram of a servo control device according to Patent Reference 1 using a related art predictive control device.

FIG. 3 is a block diagram showing the configuration of a servo control device disclosed in Patent Reference 1. In FIG. 3, a numeral 1 represents a motor, 2 a speed controller, 5' a predictive controller, 6 a differentiator, and 50 a feed-forward (FF) signal creating command filter.

When a future target command is input to the FF signal creating command filter 50, the signal creating command filter 50 creates a speed feed-forward signal $V_{FF}$, a torque feed-forward signal $T_{FF}$, a position command increment value $\Delta r$, outputs the speed feed-forward signal $V_{FF}$, the torque feed-forward signal $T_{FF}$, the position command increment value $\Delta r$ to the predictive controller 5' and outputs the speed feed-forward signal $V_{FF}$ and the torque feed-forward signal $T_{FF}$ to the speed controller 2. The predictive controller 2 inputs a position command increment value $\Delta r$, a speed feed-forward signal $V_{FF}$, a torque feed-forward signal $T_{FF}$ and an increment value of motor position, creates and outputs a speed command to the speed controller 2. The speed controller 2 inputs the speed command, the speed feed-forward signal $V_{FF}$ and the torque feed-forward signal $T_{FF}$ and feeds power to a motor. The motor 1 receives power from the speed controller and generates a torque, and generates acceleration according to the inertia or a load.

Figure 4:
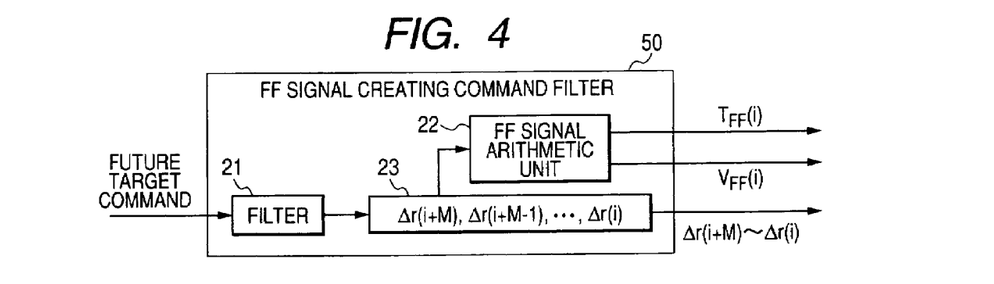
FIG. 4 is a block diagram showing an FF signal creating filter that uses a related art predictive control device.

FIG. 4 is a block diagram of a feed-forward signal creating command filter 50. In FIG. 4, a numeral 21 represents a filter, 22 a feed-forward signal arithmetic unit, and 23 a memory.

The filter 21 is a filter that can be used to filter a future target command and outputs a filtered future target command. The memory 23 inputs the output of the filter 21, stores target command increment values $\Delta r(i), \ldots, \Delta r(i+M)$ from the current time i to M sampling future (M is a natural number) and outputs the target command increment values to an FF signal arithmetic unit 22 and a predictive controller 5'. The FF signal arithmetic unit 22 inputs the output of the memory 23, creates a speed feed-forward signal $V_{FF}$ and a torque feed-forward signal $T_{FF}$ and outputs the signals to the predictive controller 5' and the speed controller 2.

Figure 2:
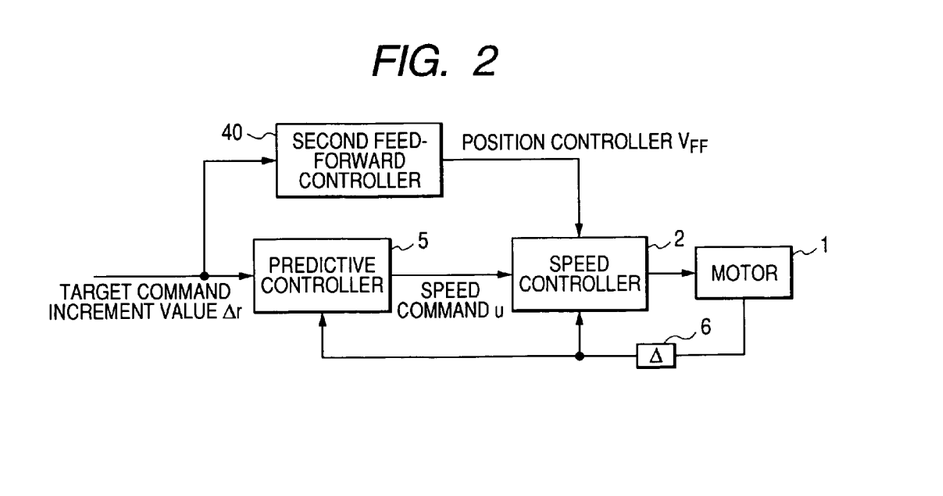
FIG. 2 is a block diagram of a related art servo control device.

FIG. 2 is a block diagram a modified version of the configuration of the servo control device disclosed in Patent Reference 1 and includes a second feed-forward controller 40, a predictive controller 5, a speed controller 2, a motor 1, and a differentiator 6 so as to match the output of the motor 1 with a target command. FIG. 3 is different from FIG. 2 in that a target command increment value $\Delta r$ to be stored into a memory 23 is directly input to the second feed-forward controller 40 and the predictive controller 5 irrespective of the presence of a filter in the feed-forward signal creating command filter 50 and that the FF signal arithmetic unit 22 computes and outputs only the speed feed-forward signal $V_{FF}$ and each of the second feed-forward controller 40 and the predictive controller 5 includes the FF signal arithmetic unit 22 and the memory 23. Thus, the speed feed-forward signal $V_{FF}(i)$ output from the second feed-forward controller 40 is output the speed controller 2 alone.

Figure 6:
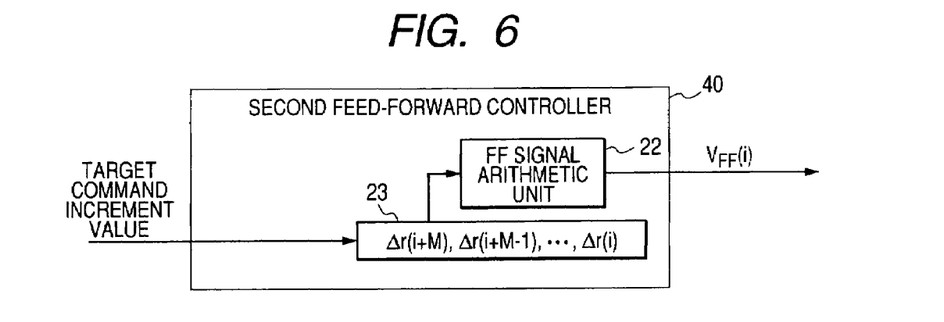
FIG. 6 is a block diagram showing an example of FF signal creating filter that uses a related art predictive controller.

FIG. 6 is a block diagram showing the configuration of a second feed-forward controller 40. Referring to FIG. 6, the feed-forward controller 40 includes a memory 23 and an FF signal arithmetic unit 22. The memory 23 sequentially stored target command increment values to store command increment values $\Delta r(i), \Delta r(i+1), \ldots, \Delta r(i+M)$ from the current time i to the M sampling future (M is a natural number) and outputs the command increment values to the FF signal arithmetic unit 22. The FF signal arithmetic unit 22 obtains and outputs a speed feed-forward signal $V_{FF}(i)$ from the command increment values $\Delta r(i), \Delta r(i+1), \ldots, \Delta r(i+M)$ output from the memory 23. The arithmetic expression to obtain a speed feed-forward signal is not limited. For example, disturbance applied to the motor 1 is known, the disturbance may be canceled with arithmetic operation or assume $$V_{FF}(i) = ffv/Ts \cdot \Delta r(i+m1)$$

where ffv is a feed-forward gain, Ts is a sampling period, $\Delta r(i+m1)$ is a command increment value of the m1 sampling future, and m1 is an integer in the range of $0 \leq m1$.

Figure 5:
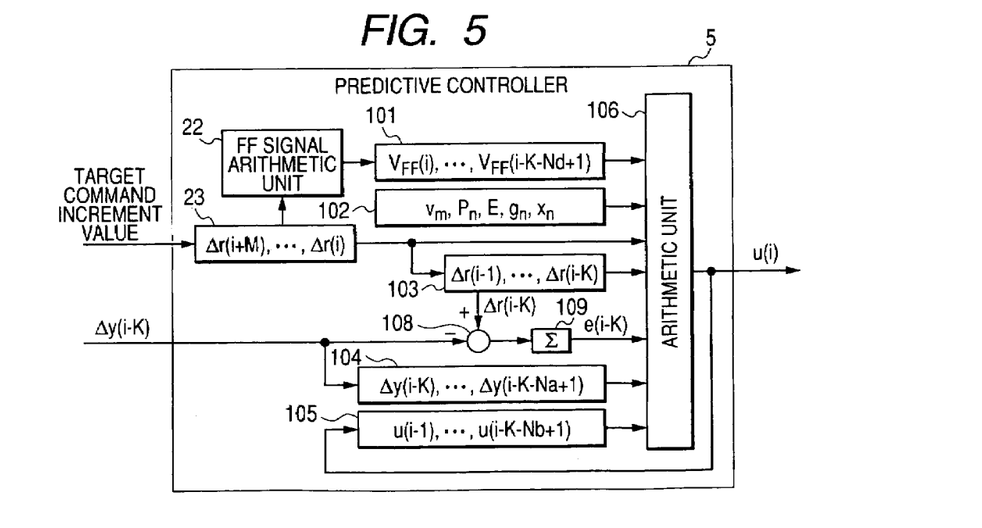
FIG. 5 is a block diagram showing an example of predictive control device that uses a related art predictive controller.

FIG. 5 is a block diagram showing the configuration of a predictive controller 5. The predictive controller 5 inputs a command increment value $\Delta r(i)$ and a position output increment value $\Delta y(i-K)$ as an increment value of the sampling period of the position output of K (K is an integer $\geq 0$) sampling past of a motor 1, obtains a future deviation predicted value by using a transfer function model from a speed command to output, and determines and output a speed command u(i) so that the evaluation function concerning the future deviation predicted value and the speed command u(i) will be minimum.

Referring to FIG. 5, the predictive controller 5 includes a FF signal arithmetic unit 22, memories 23, 101, 102, 103, 104, 105, an arithmetic unit 106, a subtracter 108, and an integrator 109. The memory 23 and the FF signal arithmetic unit 22 are the same as the memory 23 and the FF signal arithmetic unit 22 shown in FIG. 6 and $V_{FF}(i)$ is output from the FF signal arithmetic unit 22. The memory 103 inputs future command increment values $\Delta r(i+1), \Delta r(i+2), \ldots, \Delta r(i+M)$ as output of the memory 23 and stores past command increment values $\Delta r(i-1), \Delta r(i-2), \ldots, \Delta r(i-K)$. The memory 102 stores constants for predictive control $v_m(m=-K+1,-K+2, \ldots M)$, $p_n(n=0, 1, \ldots, Na)$, E, $g_n(n=1, \ldots Nb+K-1)$, $x_n(n=0, 1, \ldots Nd+K-1)$ where Na, Nb and Nd are natural numbers. The memory 104 has a position output increment value $\Delta y(i-K)$ as an input and stores past output increment values $\Delta y(i-K), \Delta y(i-K-1), \ldots, \Delta y(i-K-Na+1)$. The memory 105 has the speed command u(i) as an input and stores the past speed commands $u(i-1), u(i-2), \ldots, u(i-K-Nb+1)$. The memory 101 has as an input the output of the FF signal arithmetic unit 22 and stores $V_{FF}(i), V_{FF}(i-1), \ldots,$ (i-K-Nd+1). The subtracter 108 obtains a deviation increment value between the command increment value $\Delta r(i-K)$ stored in the memory 103 and the position output increment value $\Delta y(i-K)$. The integrator 109 integrates a deviation increment value as an output of the subtracter 108 to obtain a deviation e(i-K). The arithmetic unit 106 calculates the speed command u(i) at the current time and outputs the speed command u(i) to the speed controller 2.

[Formula 1]

$$u(i) = \sum_{m=K+1}^{M} v_m \Delta r(i+m) - \sum_{n=0}^{Na-1} p_n \Delta y(i-K-n) + \\ Ee(i-K) - \sum_{n=1}^{Nb+K-1} g_n u(i-n) - \sum_{n=0}^{Nd+K-1} x_n V_{FF}(i-n) \quad (1)$$

Next, Expression (1) is described below.

Assume that the discrete-time transmission function model from the speed feed-forward signal $V_{FF}(i)$ and speed command u(i) input to the speed controller 2 to the position output y(i) of the motor 1 is obtained as

[Formula 2]

$$y(z) = \frac{(b_1 z^{-1} + \ldots + b_{Nb} z^{-Nb})u(z) + (d_1 z^{-1} + \ldots + d_{Nd} z^{-Nd})V_{FF}(z)}{(1-z^{-1})(1 - a_1 z^{-1} - \ldots - a_{Na} z^{-Na})} \quad (2)$$

where y(z), u(z) and $V_{FF}(z)$ are respectively z conversions of y(1), u(i) and $V_{FF}(i)$.

Expression (1) is obtained when the speed command u(i) is determined so that the evaluation function

[Formula 3]

$$J = \sum_{m=1}^{M} w_m \{e^*(i+m) + \alpha e(i-K)\}^2 + c\{u(i)\}^2 + c_d \{\Delta u(i)\}^2 \quad (3)$$

will be minimum, wherein e*(i+m) is a deviation predicted value at an m sampling future time, $w_m$, a are coefficients to multiply a deviation by, c and $c_d$ are coefficients to multiply a speed command u(i) and its increment value $\Delta u(i)$. The constants $v_m$, E, $p_n$, $g_n$, $x_n$ in Expression (1) are given by

[Formula 4]

$$\beta_s = \sum_{j=1}^{s} B_{j0}, \quad W = \sum_{s=1}^{M} w_s \beta_s^2 + c + c_d,$$

$$q_s = w_s \beta_s / W$$

$$v_m = \sum_{s=m}^{M} q_s, \quad m = -K+1, -K+2, \ldots, M$$

$$E = (1+\alpha)v_1$$

$$p_n = \sum_{m=-K+1}^{M} v_m A_{m(n+K)} \quad n = 0, 1, \ldots, Na-1$$

$$g_1 = \sum_{m=-K+1}^{M} v_m B_{m1} - c_d / W,$$

$$g_n = \sum_{m=-K+1}^{M} v_m B_m \quad n = 2, \ldots, Nb + K - 1$$

$$x_n = \sum_{m=-K+1}^{M} v_m D_{mn} \quad n = 0, 1, \ldots, Nd + K - 1$$

where $A_{mn}$, $B_{mn}$, $D_{mn}$ are coefficients calculated from the coefficients of the discrete time transfer function model $a_1$-$a_{Na}$, $b_1$-$b_{Nb}$, $d_1$-$d_{Nd}$.

In this way, the related art servo control device controls a motor by using the speed command u(i) output from the predictive controller 5 and the speed feed-forward signal $V_{FF}(i)$ output from the second feed-forward controller 40.

Figure 1:
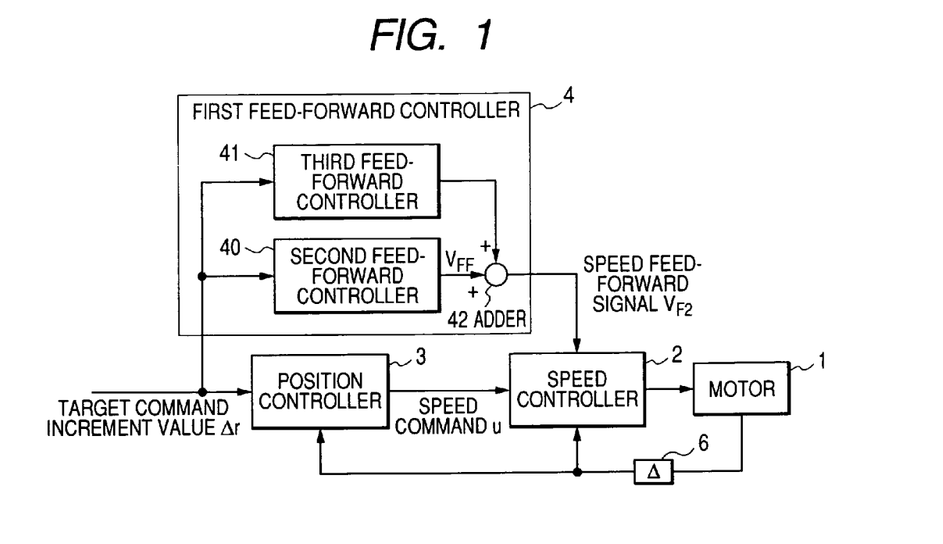
FIG. 1 is a block diagram of a servo control device showing the first and second embodiment of the invention.

As a servo control device that matches a target command with motor output, a position proportional controller may be used instead of the predictive controller 5 in FIG. 1. In this case, the deviation between the target command and the position output of the motor are proportionally multiplied to obtain a speed command.

Patent Document: JP-A-2002-62906

DISCLOSURE OF THE INVENTION

Problems to be Solved by the Invention

The related art servo control device can use a speed command u(i) created by the predictive controller 5 and a speed feed-forward signal $V_{FF}(i)$ created by the second feed-forward controller 40 to make zero the positional deviation at a constant speed. This involves a problem that it is impossible to make zero the positional deviation at a constant acceleration or at constant acceleration and jerk (time differentiation of acceleration).

While a servo control device that inputs a signal obtained by differentiating a target command as a speed feed-forward signal $V_{FF}(i)$ for position proportional control, speed PI control or speed I-P control can make zero the deviation at a constant speed or a constant acceleration, such a servo control device cannot make zero the deviation at a constant speed or constant acceleration and jerk with a control target having a viscous friction in the motor.

The invention is accomplished in view of these problems. An object of the invention is to provide a servo control device capable of making zero the positional deviation the positional deviation at a constant speed as well as the positional deviation at a constant acceleration or at constant acceleration and jerk, thereby providing a high-precision follow-up response.

Means for Solving the Problems

According to claim 1 of the invention, there is provided a servo control device including:

a speed controller for performing speed control of a motor;

a position controller for inputting a target command increment value as an increment of the sampling period of a target command and a position output increment value as an increment of the sampling period of the position output of the motor and outputting a speed command to the speed controller; and a first feed-forward controller for inputting the target command increment value and outputting a first speed feed-forward signal to the speed controller; wherein the first feed-forward controller adds a third speed feed-forward signal obtained by multiplying the second-order differentiation of the target command by a control gain to a second speed feed-forward signal $V_{FF}$, outputs as a first speed feed-forward signal $V_{F2}$ the resulting signal to the speed controller and sets the control gain so that the deviation between the target position and the position output of the motor will be zero at a constant acceleration.

According to claim 2 of the invention, there is provided a servo control device including:

a speed controller for performing speed control of a motor;

a position controller for inputting a target command increment value as an increment of the sampling period of a target command and a position output increment value as an increment of the sampling period of the position output of the motor and outputting a speed command to the speed controller; and a first feed-forward controller for inputting the target command increment value and outputting a first speed feed-forward signal to the speed controller; wherein the first feed-forward controller adds a third speed feed-forward signal obtained by multiplying the second-order differentiation of the target command by a control gain to a second speed feed-forward signal $V_{FF}$, outputs as a first speed feed-forward signal $V_{F2}$ the resulting signal to the speed controller and sets the control gain so that the deviation between the target position and the position output of the motor will be zero at a constant acceleration and, when the target command increment value $\Delta r$ is equal to or below a preset threshold at deceleration, makes zero or multiplies the output of the third feed-forward signal by a present gain and outputs the resulting signal.

According to claim 3 of the invention, there is provided the servo control device according to claim 1, wherein the first feed-forward controller generates a speed feed-forward signal $V_{F2}$ in accordance with the expression $$V_{F2} = \frac{K_2}{Ts^2}(1-z^{-1})\Delta r + V_{FF} \quad \text{[Formula 5]}$$

where $\Delta r$ is the target command increment value, Ts a sampling period, $K_2$ a control gain set so that the deviation between the target position and the position output of the motor will be zero, and $z^{-1}$ a delay corresponding to one sampling period, and outputs the signal to the speed controller.

According to claim 4 of the invention, there is provided the servo control device according to claim 2, wherein the first feed-forward controller generates a speed feed-forward signal $V_{F2}$ in accordance with the expression $$V_{F2} = \frac{K_2}{Ts^2}(1-z^{-1})\Delta r + V_{FF} \quad \text{[Formula 6]}$$

where $\Delta r$ is the target command increment value, Ts a sampling period, $K_2$ a control gain set so that the deviation between the target position and the position output of the motor will be zero, and $z^{-1}$ a delay corresponding to one sampling period and, only when the target command increment value $\Delta r$ is equal to or below a preset threshold at deceleration, generates a speed feed-forward signal $V_{F2}$ in accordance with the expression $$V_{F2} = V_{FF} \text{ or } V_{F2} = \frac{K_2 K_3}{Ts^2}(1-z^{-1})\Delta r + V_{FF} \quad \text{[Formula 7]}$$

where $K_3$ is a gain, and outputs the signal to the speed controller.

According to claim 5 of the invention, there is provided the servo control device according to claim 1 or 2, wherein the position controller is a predictive controller for inputting the target command increment value $\Delta r(i+M)$ at an M sampling future and the position output increment value $\Delta r(i-K)$ before K ($K \geq 0$) sampling at the current time I, and outputting a speed command u(i) that minimizes the evaluation function (3).

According to claim 6 of the invention, there is provided the servo control device according to claim 3 or 4, wherein the position controller has the characteristic of the transfer function $$u = \frac{V_{sum} - \frac{ffv}{Ts}X(z) + \frac{E}{1-z^{-1}}}{1+G(z)}\Delta r - \frac{\frac{E}{1-z^{-1}} + P_0}{1+G(z)}\Delta y \quad \text{[Formula 8]}$$

where u is the speed command, $\Delta y$ the position output increment value, E a control parameter, ffv a feed-forward gain, and $V_{sum}$, G(z), X(z), $P_0$ are respectively $V_{sum} = v_{sum}/\{K_{gv}(1+C_D)\}$ $G(z) = (g_1^* - C_D)z^{-1}/(1+C_D)$ $X(z) = (1+g_1^* \cdot z^{-1}/(1+C_D)$ $P_0 = (-1-g_1^* + T_s v_{sum})/\{K_{gv} T_s(1+C_D)\}$ and $g_1^*$, $v_{sum}$, $C_D$ are controller parameters and $K_{gv}$ a constant gain from a speed command to a speed feedback.

According to claim 7 of the invention, there is provided the servo control device according to claim 6, wherein the speed controller is an I-P controller, the speed feed-forward signal in the feed-forward controller is given from a feed-forward gain ffv by $V_{FF} = ffv/Ts \cdot \Delta r$, and $K_2$ as a control gain is given by $K_2 = T_i \cdot (1-ffv) + T_s\{C_D(1-ffv) - g_1^*\}/(1+g_1^*) + D \cdot T_i/(J \cdot K_v)$ where D is a viscous friction coefficient, J motor inertia, $T_i$ a speed loop integration time in the speed controller, and $K_v$ a speed loop gain in the speed controller.

According to claim 8 of the invention, there is provided the servo control device according to claim 6, wherein the speed controller is a PI controller, the second speed feed-forward signal $V_{FF}$ in the first feed-forward controller is given from the feed-forward gain ffv by $V_{FF} = ffv/Ts \cdot \Delta r$, and $K_2$ as a control gain is given by $K_2 = T_s\{C_D(1-ffv) - g_1^*\}/(1+g_1^*) + D \cdot T_i/(J \cdot K_v)$ where D is a viscous friction coefficient, J motor inertia, $T_i$ a speed loop integration time in the speed controller, and $K_v$ a speed loop gain in the speed controller.

According to claim 9 of the invention, there is provided the servo control device according to claim 3 or 4, wherein the position controller is a proportional controller, the speed controller is a PI controller or an I-P controller, and the speed feed-forward signal $V_{FF}$ in the feed-forward controller is given from the feed-forward gain ffv by $V_{FF} = ffv/Ts \cdot \Delta r$ and $K_2$ and ffv as parameters are given by $K_2 = D \cdot T_i/(J \cdot K_v)$ ffv=1 where D is a viscous friction coefficient, Jmotor inertia, $T_i$ a speed loop integration time in the speed controller, and $K_v$ a speed loop gain in the speed controller.

According to claim 10 of the invention, there is provided a servo control device that makes control so as to match the output of a motor having viscous friction with a target command, the device including:

a speed controller for performing speed control of the motor;

a position controller for inputting a target command increment value as an increment of the sampling period of the target command and a position output increment value as an increment of the sampling period of the position output of the motor and outputting a speed command to the speed controller; and a feed-forward controller for inputting the target command increment value and outputting a speed feed-forward signal to the speed controller; wherein the feed-forward controller adds a third speed feed-forward signal obtained by multiplying the second-order differentiation of the target command by a control gain to a second speed feed-forward signal $V_{FF}$, and outputs as a speed feed-forward signal $V_{F2}$ the resulting signal, and the gain ffv and the gain $K_2$ are set so that the deviation between the target command and the position output of the motor will be zero at a constant acceleration and at a constant jerk.

According to claim 11 of the invention, there is provided a servo control device that makes control so as to match the output of a motor having viscous friction with a target command, the device including:

a speed controller for performing speed control of the motor;

a position controller for inputting a target command increment value as an increment of the sampling period of the target command and a position output increment value as an increment of the sampling period of the position output of the motor and outputting a speed command to the speed controller; and a feed-forward controller for inputting the target command increment value and outputting a speed feed-forward signal to the speed controller; wherein the feed-forward controller adds a third speed feed-forward signal obtained by multiplying the second-order differentiation of the target command by a control gain to a second speed feed-forward signal $V_{FF}$ and outputs as a speed feed-forward signal $V_{F2}$ the resulting signal, the gain ffv and the gain $K_2$ are set so that the deviation between the target command and the position output of the motor will be zero at a constant acceleration and at a constant jerk, and when the target command increment value $\Delta r$ is equal to or below a preset threshold at deceleration, the feed-forward controller makes zero the gain $K_2$ or sets a gain obtained by multiplying the gain $K_2$ by a preset gain $K_3$.

According to claim 12 of the invention, there is provided the servo control device according to claim 10, wherein the feed-forward controller is a feed-forward controller that generates the speed feed-forward signal $V_{F2}$ in accordance with $$V_{F2} = \frac{K_2}{Ts^2}(1-z^{-1})\Delta r + V_{FF} \qquad \text{[Formula 9]}$$

where $\Delta r$ is the target command increment value, Ts a sampling period, $K_2$ a control gain, and $z^{-1}$ a delay corresponding to one sampling period.

According to claim 13 of the invention, there is provided the servo control device according to claim 11, wherein the feed-forward controller is a feed-forward controller that generates the speed feed-forward signal $V_{F2}$ in accordance with $$V_{F2} = \frac{K_2}{Ts^2}(1-z^{-1})\Delta r + V_{FF} \qquad \text{[Formula 10]}$$

where $\Delta r$ is the target command increment value, Ts a sampling period, $K_2$ a control gain, and $z^{-1}$ a delay corresponding to one sampling period, and when the target command increment value is equal to or below a preset threshold at deceleration, generates a speed feed-forward signal $V_{F2}$ in accordance with the expression $$V_{F2} = V_{FF} \text{ or } V_{F2} = \frac{K_2 K_3}{Ts^2}(1-z^{-1})\Delta r + V_{FF} \qquad \text{[Formula 11]}$$

where $K_3$ is a gain.

According to claim 14 of the invention, there is provided the servo control device according to claim 10 or 11, wherein the position controller is a predictive controller for inputting the target command increment value $\Delta r(i+M)$ at an M sampling future and the position output increment value $\Delta r(i-K)$ before K ($K \geq 0$) sampling at the current time I, and outputting a speed command u(i) that minimizes the evaluation function $$J = \sum_{m=1}^{M} w_m \{e^*(i+m) + \alpha e(i-K)\}^2 + c\{u(i)\}^2 + c_d\{\Delta u(i)\}^2 \qquad \text{[Formula 12]}$$

will be minimum, wherein $e^*(i+m)$ is a deviation predicted value at an m sampling future time, $w_m$, $\alpha$ are coefficients to multiply a deviation by, c and $c_d$ are coefficients to multiply a speed command u(i) and its increment value $\Delta u(i)$.

According to claim 15 of the invention, there is provided the servo control device according to claim 10 or 11, wherein the position controller has a transfer function characteristic that $$u = \frac{V_{sum} - \frac{ffv}{Ts}X(z) + \frac{E}{1-z^{-1}}}{1+G(z)}\Delta r - \frac{\frac{E}{1-z^{-1}} + P_0}{1+G(z)}\Delta y \qquad \text{[Formula 13]}$$

where u is the speed command, $\Delta y$ the position output increment value, E a control parameter, ffv a feed-forward gain, and $V_{sum}$, G(z), X(z), $P_0$ are respectively $$V_{sum} = \frac{v_{sum}}{Kgv(1+C_D)} \qquad \text{[Formula 14]}$$

$$G(z) = \frac{(g_1^* - C_D)z^{-1}}{1+C_D}$$

-continued $$X(z) = \frac{1 + g_1^* \cdot z^{-1}}{1 + C_D}$$

$$P_0 = \frac{-1 - g_1^* + Ts \cdot v_{sum}}{Kgv \cdot Ts(1 + C_D)}$$

where $g_1^*$, $v_{sum}$, $C_D$ are control parameters, $K_{gv}$ is a constant gain from a speed command to a speed feedback.

According to claim 16 of the invention, there is provided the servo control device according to claim 15, wherein the speed controller is an I-P controller, and the feed-forward signal $V_{FF}$ in the feed-forward controller is given from a feed-forward gain ffv by $V_{FF}$=ffv/Ts·Δr, that the feed-forward gain ffv is given by $$ffv = \frac{D \cdot Ti(1 + g1^*)^2(Ti - 2Ts)}{J \cdot Kv\{Ti^2(1 + g1^*)^2 + C_D \cdot Ti \cdot Ts(1 + g1^*) + C_D \cdot Ts^2(C_D - g1^*)\}} + $$

$$\frac{J\{(1 + g1^*)^2 Kv \cdot Ti^2 + Kv \cdot Ts^2(C_D - g1^*)^2 - Ti(1 + g1^*)(1 + g1^* - C_D \cdot Kv \cdot Ts + g1^* \cdot Kv \cdot Ts)\}}{J \cdot Kv\{Ti^2(1 + g1^*)^2 + C_D \cdot Ti \cdot Ts(1 + g1^*) + C_D \cdot Ts^2(C_D - g1^*)\}}$$ [Formula 15]

where D is a viscous friction coefficient, Jmotor inertia, $T_i$ a speed loop integration time in the speed controller, and $K_v$ a speed loop gain in the speed controller, and $K_2$ as a control gain is given by $$K_2 = Ti(1 - ffv) + \frac{Ts}{1 + g_1^*}\{C_D(1 - ffv) - g_1^*\} + \frac{D \cdot Ti}{J \cdot Kv}$$ [Formula 16]

According to claim 17 of the invention, there is provided the servo control device according to claim 15, wherein the speed controller is a PI controller, the speed feed-forward signal $V_{FF}$ in the feed-forward controller is given from a feed-forward gain ffv by $V_{FF}$=ffv/Ts·Δr, the feed-forward gain ffv is given by $$ffv = \frac{D \cdot Ti(1 + g1^*)^2(Ti - 2Ts) - J\{(1 + g1^*)^2 Ti - Kv \cdot Ts^2(C_D - g1^*)^2\}}{J \cdot Kv \cdot Ts^2 \cdot C_D(C_D - g1^*)}$$ [Formula 17]

where D is a viscous friction coefficient, Jmotor inertia, $T_i$ a speed loop integration time in the speed controller, and $K_v$ a speed loop gain in the speed controller, and $K_2$ as a control gain is given by $$K_2 = \frac{Ts}{1 + g_1^*}\{C_D(1 - ffv) - g_1^*\} + \frac{D \cdot Ti}{J \cdot Kv}.$$ [Formula 18]

EFFECT OF THE INVENTION

According to the invention, it is possible to make zero the positional deviation at a constant speed as well as the positional deviation at a constant acceleration or at constant acceleration and jerk thus providing a high-precision follow-up response. According to the second and eleventh aspects of the invention, it is possible to further reduce the positional deviation after command delivery.

DESCRIPTION OF REFERENCE NUMERALS AND SIGNS

1: Motor
2: Speed controller
3: Position controller
4: First feed-forward controller
5: Predictive controller
5': Predictive controller
6: Differentiator
7: First feed-forward controller
21: Filter
22: FF signal arithmetic unit
23: Memory
40: Second feed-forward controller
41: Third feed-forward controller
42: Adder
43: Means of changing feed-forward
50: FF signal creating command filter
60: Predictive controller
70: Second feed-forward controller
71: Third feed-forward controller
72: Adder
73: Means of changing feed-forward
100: Memory
101: Memory
102: Memory
103: Memory
104: Memory
105: Memory
106: Arithmetic unit
108: Arithmetic unit
109: Arithmetic unit

BEST MODE FOR CARRYING OUT THE INVENTION

Embodiments of the invention will be described referring to drawings.

EMBODIMENT 1

FIG. 1 is a block diagram of a servo control device showing Embodiment 1 of the invention. In FIG. 1, a numeral 1 represents a motor, 2 a speed controller, 3 a position controller, 4 a first feed-forward controller, 40 a second feed-forward controller, 41 a third feed-forward controller, and 42 an adder.

The first feed-forward controller 4 includes the second feed-forward controller 40, the third feed-forward controller 41 and the adder 42. Based on a target command increment value $\Delta r$ as an increment of the sampling period of a target command given from a host controller (not shown), the first feed-forward controller 4 adds, by way of the adder 42, a second speed feed-forward signal $V_{FF}$ as the output of the second feed-forward controller 40 and a third speed feed-forward signal as the output of the third feed-forward controller 41 having a transfer function characteristic $$K_2(1-z^{-1})/Ts^2$$

and outputs the result as a first speed feed-forward signal $V_{F2}$ to a speed controller.

That is, the speed feed-forward signal $V_{F2}$ is given by $$V_{F2}=[\{K_2(1-z^{-1})\Delta r\}/Ts^2]+V_{FF} \quad (4)$$

where $\Delta r$ is a target command increment value, Ts a sampling period, $K_2$ a control gain, and $V_{FF}$ a second speed feed-forward signal, which may be given from the feed-forward gain ffs as $$V_{FF}(i)=ffv/Ts\cdot\Delta r \quad (5)$$

The servo control device according to this embodiment differs from Patent Reference 1 in that a signal obtained by adding a signal obtained by multiplying the second-order differentiation of the target command to the second speed feed-forward signal $V_{FF}$ is defined as the first speed feed-forward signal $V_{F2}$.

In this case it is assumed that the speed controller 2 is an I-P controller or a PI controller. The position controller 3 may be a known controller such as a predictive controller 5 described in Patent Reference 1. Assume that a discrete time transfer function model from the speed feed-forward signal $V_{FF}(i)$ and the speed command u(i) to the output y(i) of the motor 1 is given by

[Formula 19]

$$y(z) = K_{gv} \frac{(b'_1 z^{-1} + \ldots + b'_{Nb} z^{-Nb})u(z) + (d'_1 z^{-1} \ldots + d'_{Nd} z^{-Nd})V_{FF}(z)}{(1-z^{-1})(1-a_1 z^{-1} - \ldots - a_{Na} z^{-Na})} \quad (6)$$

where $K_{gv}$ is given by a constant gain from the speed command to the speed feedback and Na=1, Nb=2, Nd=2, $d_n'=b_n'$ (n=1,2), and K=0. Further, the speed command u(i) output from the position controller 3 is given by

[Formula 20]

$$u(i) = \sum_{m=1}^{M} v_m \Delta r(i+m) - p_0 \Delta y(i) + Ee(i) - g_1 u(i-1) - \sum_{n=0}^{1} x_n V_{FF}(i-n) \quad (7)$$

and the constants $v_m$, E, $p_0$, $g_1$, and $x_n$ (n=1,2) are given by

[Formula 21]

$$\beta'_s = \sum_{j=1}^{s} B'_{j0}, \; Wc' = \sum_{s=1}^{M} \beta'^2_s, \; q^*_s = \beta'_s / W'_c \quad (8)$$

$$v^*_m = \sum_{s=m}^{M} q^*_s, \; v_m = \frac{v^*_m}{K_{gv}(1+C+C_D)} \; m=1,2,3,\ldots,M$$

$$E = \frac{(1+\alpha)v^*_1}{K_{gv}(1+C+C_D)}$$

$$p^*_0 = \sum_{m=1}^{M} v^*_m A_{m0}$$

$$P_0 = \frac{p^*_0}{K_{gv}(1+C+C_D)}$$

$$g^*_1 = \sum_{m=1}^{M} v^*_m B'_{m1}$$

$$g_1 = \frac{g^*_1 - C_D}{1+C+C_D}$$

$$x_0 = \frac{1}{1+C+C_D}, \; x_1 = \frac{g^*_1}{1+C+C_D}$$

where $A_{mn}$, $B_{mn}'$ are coefficients calculated from the coefficients $a_{mn}, -a_{mn}, b'_1-b'_{Nb}$ of the discrete time transfer function model in Expression (6).

From Expressions (5), (7) and (8), the transfer function of the position controller 3 in FIG. 1 is given by

[Formula 22]

$$u = \frac{V_{sum} - \frac{ffv}{Ts}X(z) + \frac{E}{1-z^{-1}}}{1+G(z)} \Delta r - \frac{\frac{E}{1-z^{-1}} + P_0}{1+G(z)} \Delta y \quad (9)$$

where $V_{sum}$, $G(z)$, $X(z)$, $P_0$ are given as follows assuming that $C=0$:

[Formula 23]

$$v_{sum} = \sum_{m=1}^{M} v_m^* \qquad (10)$$
$$V_{sum} = \frac{v_{sum}}{Kgv(1+C_D)}$$
$$G(z) = \frac{(g_1^* - C_D)z^{-1}}{1+C_D}$$
$$X(z) = \frac{1 + g_1^* \cdot z^{-1}}{1+C_D}$$
$$P_0 = \frac{-1 - g_1^* + Ts \cdot v_{sum}}{Kgv \cdot Ts(1+C_D)}$$

The position controller 3 in the servo control device according to this embodiment is not necessarily a predictive control system but may be an arbitrary position controller satisfying Expressions (9) and (10). As long as the speed controller 2 is an I-P controller, the control gain $K_2$ in the first feed-forward controller 4 may be given by

[Formula 24]

$$K_2 = Ti(1 - f\!f\!v) + \frac{Ts}{1+g_1^*}(C_D(1-f\!f\!v) - g_1^*) + \frac{D \cdot Ti}{J \cdot Kv} \qquad (11)$$

where D is a viscous friction coefficient, Jmotor inertia, $T_i$ a speed loop integration time constant in the speed controller, and $K_v$ a speed loop gain in the speed controller thus making zero the deviation at a constant acceleration. In case the speed controller 2 is a PI controller, the control gain $K_2$ may be given by

[Formula 25]

$$K_2 = \frac{Ts}{1+g_1^*}(C_D(1-f\!f\!v) - g_1^*) + \frac{D \cdot Ti}{J \cdot Kv} \qquad (12)$$

so as to make zero the deviation at a constant acceleration.

Embodiment 2

The position controller 3 in the servo control device shown in FIG. 1 may be a position controller of another configuration in place of a predictive controller. In case the position controller 3 is a position proportional controller and the speed controller 2 is a speed I-P controller or a speed PI controller, the deviation at a constant acceleration is made zero by using $K2=DT_i/(JK_v)$ ffv=1.

Embodiment 3

Figure 7:
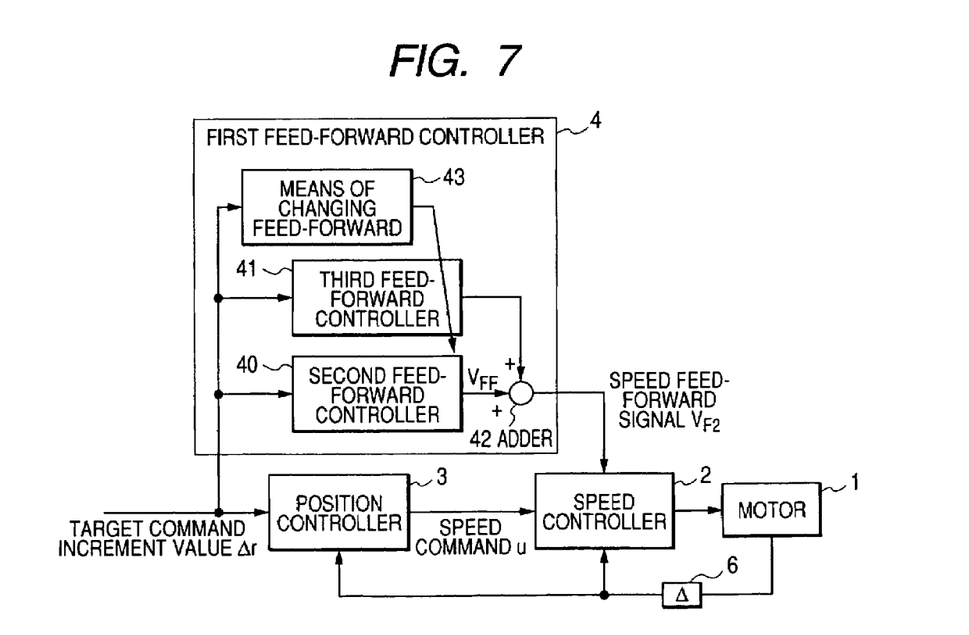
FIG. 7 is a block diagram showing a servo control device showing the third embodiment of the invention.

FIG. 7 shows the first feed-forward controller 4 in the servo control device shown in FIG. 1 including means of changing feed-forward 43 added therein. The means of changing feed-forward 43 makes zero the output of the third feed-forward controller 41 or multiplies the output of the third feed-forward controller 41 by a present gain and outputs the result, thereby further reducing the positional deviation after delivery of command.

Embodiment 4

Figure 8:
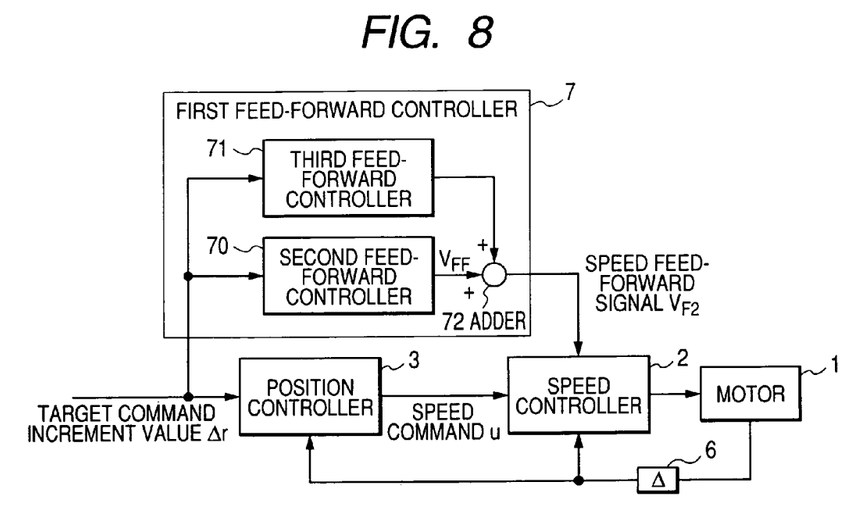
FIG. 8 is a block diagram showing a servo control device showing the third embodiment of the invention.

FIG. 8 is a block diagram of a servo control device to illustrate Embodiment 4 of the invention. In FIG. 8, the servo control device includes a first feed-forward controller 7, a position controller 3, and a speed controller 2. The servo control device controls the motor 1.

The first feed-forward controller 7 includes a second feed-forward controller 70, a third feed-forward controller 71 and an adder 72. Based on a target command increment value as an increment of the sampling period of a target command given from a host controller (not shown), the first feed-forward controller 7 adds, by way of the adder 72, a related art speed feed-forward signal $V_{FF}$ as the output of the second feed-forward controller 70 and the output of the third feed-forward controller 71 having a transfer function characteristic

[Formula 26]

$$\frac{K_2}{Ts^2}(1-z^{-1})$$

and generates the result as a speed feed-forward signal $V_{F2}$. That is, the speed feed-forward signal $V_{F2}$ is given by

[Formula 27]

$$V_{F2} = \frac{K_2}{Ts^2}(1-z^{-1})\Delta r + V_{FF} \qquad (13)$$

where $\Delta r$ is a target command increment value, Ts a sampling period, $K_2$ a control gain, and $V_{FF}$ a speed feed-forward signal that is generally used, which may be given from the feed-forward gain ffs as

[Formula 28]

$$V_{FF} = \frac{f\!f\!v}{Ts}\Delta r \qquad (14)$$

The servo control device according to this embodiment differs from Patent Reference 1 in that a signal obtained by adding a signal obtained by multiplying the second-order differentiation of the target command to the typical speed feed-forward signal $V_{FF}$ is defined as the speed feed-forward signal $V_{F2}$.

In this case it is assumed that the speed controller 2 is an I-P controller or a PI controller. The position controller 3 may be a known controller such as a predictive controller 5 described in Patent Reference 1. Assume that a discrete time transfer function model from the speed feed-forward signal $V_{FF}(i)$ and the speed command u(i) to the output y(i) of the motor 1 is given by

[Formula 29]

$$y(z)=K_{gv}\{(b_1'z^{-1}+\ldots+b_{Nb}'z^{-Nb})u(z)+(d_1'z^{-1}+\ldots +d_{Nd}'z^{-Nd})V_{FF}(z)\}/\{(1-z^{-1})(1-a_1'z^{-1}-\ldots -a_{Na}z^{-Na})\} \qquad (15)$$

where $K_{gv}$ is given by a constant gain from the speed command to the speed feedback and Na=1, Nb=2, Nd=2, $d_n'=b_n'$ (n=1,2), and K=0. Further, the speed command u(i) output from the position controller 3 is given by

[Formula 30]

$$u(i) = \sum_{m=1}^{M} v_m \Delta r(i+m) - p_0 \Delta y(i) + \quad (16)$$
$$Ee(i) - g_1 u(i-1) - \sum_{n=0}^{1} x_n V_{FF}(i-n)$$

and the constants $v_m$, E, $p_0$, $g_1$, and $x_n$ (n=1,2) are given by

[Formula 31]

$$\beta'_s = \sum_{j=1}^{s} B'_{j0}, \; W'_c = \sum_{s=1}^{M} \beta_s'^2, \; q_s^* = \beta'_s / W'_c \quad (17)$$

$$v_m^* = \sum_{s=m}^{M} q_s^*, \; v_m = \frac{v_m^*}{K_{gv}(1+C+C_D)}, \; m=1,2,\ldots,M$$

$$E = \frac{(1+\alpha)v_1^*}{K_{gv}(1+C+C_D)}$$

$$P_0^* = \sum_{m=1}^{M} v_m^* A_{m0}$$

$$P_0 = \frac{p_0^*}{K_{gv}(1+C+C_D)}$$

$$g_1^* = \sum_{m=1}^{M} v_m^* B'_{m1}$$

$$g_1 = \frac{g_1^* - C_D}{1+C+C_D}$$

$$x_0 = \frac{1}{1+C+C_D}, \; x_1 = \frac{g_1^*}{1+C+C_D}$$

where $A_{mn}$, $B_{mn}'$ are coefficients calculated from the coefficients $a_{mn}, -a_{mn}, b'_1 - b'_{Nb}$ of the discrete time transfer function model in Expression (15).

From Expressions (14), (16) and (17), the transfer function of the position controller 3 in FIG. 8 is given by

[Formula 32]

$$u = \frac{V_{sum} - \frac{ffv}{Ts}X(z) + \frac{E}{1-z^{-1}}\Delta r - \frac{\frac{E}{1-z^{-1}} + P_0}{1+G(z)}\Delta y \quad (18)$$

where $V_{sum}$, G(z), X(z), $P_0$ are given as follows assuming that C=0:

[Formula 33]

$$v_{sum} = \sum_{m=1}^{M} v_m^* \quad (19)$$

$$V_{sum} = \frac{v_{sum}}{K_{gv}(1+C_D)}$$

$$G(z) = \frac{(g_1^* - C_D)z^{-1}}{1+C_D}$$

$$X(z) = \frac{1+g_1^* \cdot z^{-1}}{1+C_D}$$

$$P_0 = \frac{-1-g_1^* + Ts \cdot v_{sum}}{K_{gv} \cdot Ts(1+C_D)}$$

The position controller 3 in the servo control device according to this embodiment is not necessarily a predictive control system but may be an arbitrary position controller satisfying Expressions (18) and (19). As long as the speed controller 2 is an I-P controller, the speed feed-forward gain ffv in the first feed-forward controller 7 may be given by

[Formula 34]

$$ffv = \frac{D \cdot Ti(1+g1^*)^2(Ti-2Ts) + J\left\{\begin{array}{c}(1+g1^*)^2 Kv \cdot Ti^2 + Kv \cdot \\ Ts^2(C_D - g1^*)^2 - Ti(1+g1^*)(1+g1^* - \\ C_D \cdot Kv \cdot Ts + g1^* \cdot Kv \cdot Ts)\end{array}\right\}}{J \cdot Kv\left\{\begin{array}{c}Ti^2(1+g1^*)^2 + C_D \cdot Ti \cdot \\ Ts(1+g1^*) + \\ C_D \cdot Ts^2(C_D - g1^*)\end{array}\right\}}$$

where D is a viscous friction coefficient, Jmotor inertia, $T_i$ a speed loop integration time constant in the speed controller, and $K_v$ a speed loop gain in the speed controller and the control gain $K_2$ is given by $$K_2 = Ti(1-ffv) + \frac{Ts}{1+g_1^*}(C_D(1-ffv) - g_1^*) + \frac{D \cdot Ti}{J \cdot Kv} \quad \text{[Formula 35]}$$

so that when a target command to provide a constant acceleration $$r = \frac{A \cdot Ts^2 \cdot z^{-1} \cdot (1+z^{-1})}{2 \cdot (1-z^{-1})^3} \quad \text{[Formula 36]}$$

(where A is a constant gain of acceleration) is input,

[Formula 37]

the value of the expression (20)

$$\lim_{z \to 1}(1-z^{-1})e(z)$$

is 0 from the theorem of a final value, so that the deviation at a constant acceleration is zero. Note that e(z) is a z conversion of the deviation e between the target command and the output of the motor 1. Similarly, when a target command that provides a constant jerk $$r = \frac{Jr \cdot Ts^3 \cdot z^{-2} \cdot (1+4 \cdot z^{-1} + z^{-2})}{6 \cdot (1-z^{-1})^4} \quad \text{[Formula 38]}$$

(where Jr is a constant gain of a jerk) is input, the value of Expression (20) becomes 0 so that the deviation at a constant jerk is zero.

In case the speed controller 2 is a PI controller, the speed feed-forward gain ffv is given by $$ffv = \frac{D \cdot Ti(1+g1^*)^2(Ti-2Ts) - J\{(1+g1^*)^2 Ti - Kv \cdot Ts^2(C_D - g1^*)^2\}}{J \cdot Kv \cdot Ts^2 \cdot C_D(C_D - g1^*)} \quad \text{[Formula 39]}$$

and the control gain $K_2$ is given by $$K_2 = \frac{Ts}{1+g_1^*}(C_D(1-ffv)-g_1^*) + \frac{D \cdot Ti}{J \cdot Kv} \quad \text{[Formula 40]}$$

so that the deviation at constant acceleration and jerk is zero, same as the case of the I-P controller.

Embodiment 5

Figure 9:
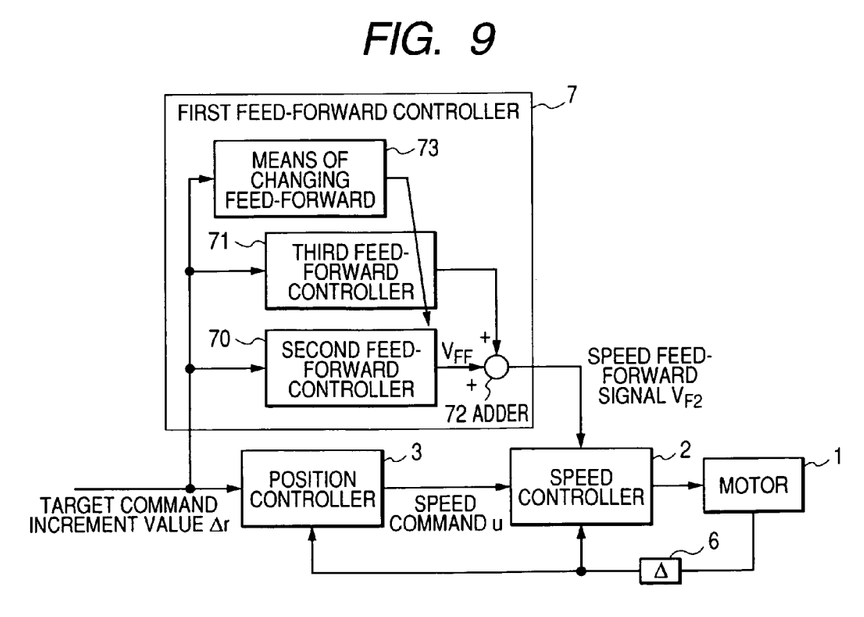
FIG. 9 is a block diagram showing a servo control device showing the third embodiment of the invention.

FIG. 9 shows the first feed-forward controller 7 in the servo control device shown in FIG. 8 including means of changing feed-forward 73 added therein. The means of changing feed-forward 73 makes zero the output of the third feed-forward controller 71 or multiplies the output of the third feed-forward controller 71 by a present gain and outputs the result, thereby further reducing the positional deviation after delivery of command.

While the invention are described in detail referring to specific embodiments, those skilled in the art will recognize that various changes and modifications can be made in it without departing the spirit and scope thereof.

This application is based on the Japanese Patent Application Nos. 2005-106437 and 2005-106438 filed Apr. 1, 2005 and the contents thereof are herein incorporated by reference.

INDUSTRIAL APPLICABILITY

By using, as a speed feed-forward signal, a signal obtained by adding a signal obtained by multiplying the differential of a target command by a feed-forward gain ffv and a signal obtained by multiplying the second-order differentiation of the target command by a control gain K2, it is possible to make zero the positional deviation at a constant acceleration or at constant acceleration and jerk thus providing a high-precision follow-up response. It is thus possible to apply the invention to a machine that performs synchronized control.

The invention claimed is:

1. A servo control device comprising:
a speed controller for performing speed control of a motor;
a position controller for inputting a target command increment value as an increment of the sampling period of a target command and a position output increment value as an increment of the sampling period of the position output of the motor and outputting a speed command to the speed controller; and
a first feed-forward controller for inputting the target command increment value and outputting a first speed feed-forward signal to the speed controller; wherein
the first feed-forward controller adds a third speed feed-forward signal obtained by multiplying the second-order differentiation of the target command by a control gain to a second speed feed-forward signal $V_{FF}$, outputs as a first speed feed-forward signal $V_{F2}$ the resulting signal to the speed controller and sets the control gain so that the deviation between the target position and the position output of the motor will be zero at a constant acceleration.

2. A servo control device comprising:
a speed controller for performing speed control of a motor;
a position controller for inputting a target command increment value as an increment of the sampling period of a target command and a position output increment value as an increment of the sampling period of the position output of the motor and outputting a speed command to the speed controller; and
a first feed-forward controller for inputting the target command increment value and outputting a first speed feed-forward signal to the speed controller; wherein
the first feed-forward controller adds a third speed feed-forward signal obtained by multiplying the second-order differentiation of the target command by a control gain to a second speed feed-forward signal $V_{FF}$, outputs as a first speed feed-forward signal $V_{F2}$ the resulting signal to the speed controller and sets the control gain so that the deviation between the target position and the position output of the motor will be zero at a constant acceleration and, when the target command increment value Δr is equal to or below a preset threshold at deceleration, makes zero or multiplies the output of the third feed-forward signal by a present gain and outputs the resulting signal.

3. The servo control device according to claim 1, wherein the first feed-forward controller generates a speed feed-forward signal $V_{F2}$ in accordance with the expression $$V_{F2} = \frac{K_2}{Ts^2}(1-z^{-1})\Delta r + V_{FF} \quad \text{[Formula 1]}$$

where Δr is the target command increment value, Ts a sampling period, $K_2$ a control gain set so that the deviation between the target position and the position output of the motor will be zero, and $z^{-1}$ a delay corresponding to one sampling period, and
outputs the signal to the speed controller.

4. The servo control device according to claim 2, wherein the first feed-forward controller generates a speed feed-forward signal $V_{F2}$ in accordance with the expression $$V_{F2} = \frac{K_2}{Ts^2}(1-z^{-1})\Delta r + V_{FF} \quad \text{[Formula 2]}$$

where Δr is the target command increment value, Ts a sampling period, $K_2$ a control gain set so that the deviation between the target position and the position output of the motor will be zero, and $z^{-1}$ a delay corresponding to one sampling period and,
only when the target command increment value Δr is equal to or below a preset threshold at deceleration, generates a speed feed-forward signal $V_{F2}$ in accordance with the expression $$V_{F2} = V_{FF} \text{ or } V_{F2} = \frac{K_2 K_3}{Ts^2}(1-z^{-1})\Delta r + V_{FF} \quad \text{[Formula 3]}$$

where $K_3$ is a gain, and
outputs the signal to the speed controller.

5. The servo control device according to claim 1 or 2, wherein
the position controller is a predictive controller for inputting the target command increment value Δr(i+M) at an M sampling future and the position output increment value Δr(i−K) before K (K≧0) sampling at the current time i, and outputting a speed command u(i) that minimizes the evaluation function $$J = \sum_{m=1}^{M} w_m \{e^*(i+m) + \alpha e(i-K)\}^2 + c\{u(i)\}^2 + c_d\{\Delta u(i)\}^2 \quad \text{[Formula 4]}$$

will be minimum, wherein $e^*(i+m)$ is a deviation predicted value at an m sampling future time, $w_m$, α are coefficients to multiply a deviation by, c and $c_d$ are coefficients to multiply a speed command $u(i)$ and its increment value $\Delta u(i)$.

6. The servo control device according to claim 3 or 4, wherein the position controller has the characteristic of the transfer function $$u = \frac{V_{sum} - \frac{ffv}{Ts}X(z) + \frac{E}{1-z^{-1}}}{1+G(z)}\Delta r - \frac{\frac{E}{1-z^{-1}} + P_0}{1+G(z)}\Delta y \quad \text{[Formula 5]}$$

where u is the speed command, $\Delta y$ the position output increment value, E a control parameter, ffv a feed-forward gain, and $V_{sum}$, $G(z)$, $X(z)$, $P_0$ are respectively $V_{sum} = v_{sum}/\{K_{gv}(1+C_D)\}$ $G(z) = (g_1^* - C_D)z^{-1}/(1+C_D)$ $X(z) = (1+g_1^* \cdot z^{-1}/(1+C_D)$ $P_0 = (-1-g_1^* + T_s v_{sum})/\{K_{gv}T_s(1+C_D)\}$ and $g_1^*$, $v_{sum}$, $C_D$ are controller parameters and $K_{gv}$ a constant gain from a speed command to a speed feedback.

7. The servo control device according to claim 6, wherein the speed controller is an I-P controller, the speed feed-forward signal in the feed-forward controller is given from a feed-forward gain ffv by $V_{FF} = ffv/Ts \cdot \Delta r$, and $K_2$ as a control gain is given by $K_2 = T_i(1-ffv) + T_s\{C_D(1-ffv) - g_1^*\}/(1+g_1^*) + D \cdot T_i/(J \cdot K_v)$ where D is a viscous friction coefficient, Jmotor inertia, $T_i$ a speed loop integration time in the speed controller, and $K_v$ a speed loop gain in the speed controller.

8. The servo control device according to claim 6, wherein the speed controller is a PI controller, the second speed feed-forward signal $V_{FF}$ in the first feed-forward controller is given from the feed-forward gain ffv by $V_{FF} = ffv/Ts \cdot \Delta r$, and $K_2$ as a control gain is given by $K_2 = T_s\{C_D(1-ffv) - g_1^*\}/(1+g_1^*) + D \cdot T_i/(J \cdot K_v)$ where D is a viscous friction coefficient, Jmotor inertia, $T_i$ a speed loop integration time in the speed controller, and $K_v$ a speed loop gain in the speed controller.

9. The servo control device according to claim 3 or 4, wherein
the position controller is a proportional controller,
the speed controller is a PI controller or an I-P controller, and
the speed feed-forward signal $V_{FF}$ in the feed-forward controller is given from the feed-forward gain ffv by $V_{FF} = ffv/Ts \cdot \Delta r$ and $K_2$ and ffv as parameters are given by $K_2 = D \cdot T_i/(J \cdot K_v)$ ffv=1 where D is a viscous friction coefficient, Jmotor inertia, $T_i$ a speed loop integration time in the speed controller, and $K_v$ a speed loop gain in the speed controller.

10. A servo control device that makes control so as to match the output of a motor having viscous friction with a target command, the device comprising:

a speed controller for performing speed control of the motor;

a position controller for inputting a target command increment value as an increment of the sampling period of the target command and a position output increment value as an increment of the sampling period of the position output of the motor and outputting a speed command to the speed controller; and a feed-forward controller for inputting the target command increment value and outputting a speed feed-forward signal to the speed controller; wherein the feed-forward controller adds a third speed feed-forward signal obtained by multiplying the second-order differentiation of the target command by a control gain to a second speed feed-forward signal $V_{FF}$, and outputs as a speed feed-forward signal $V_{F2}$ the resulting signal, and the gain ffv and the gain $K_2$ are set so that the deviation between the target command and the position output of the motor will be zero at a constant acceleration and at a constant jerk.

11. A servo control device that makes control so as to match the output of a motor having viscous friction with a target command, the device comprising:

a speed controller for performing speed control of the motor;

a position controller for inputting a target command increment value as an increment of the sampling period of the target command and a position output increment value as an increment of the sampling period of the position output of the motor and outputting a speed command to the speed controller; and a feed-forward controller for inputting the target command increment value and outputting a speed feed-forward signal to the speed controller; wherein the feed-forward controller adds a third speed feed-forward signal obtained by multiplying the second-order differentiation of the target command by a control gain to a second speed feed-forward signal $V_{FF}$ and outputs as a speed feed-forward signal $V_{F2}$ the resulting signal, the gain ffv and the gain $K_2$ are set so that the deviation between the target command and the position output of the motor will be zero at a constant acceleration and at a constant jerk, and when the target command increment value $\Delta r$ is equal to or below a preset threshold at deceleration, the feed-forward controller makes zero the gain $K_2$ or sets a gain obtained by multiplying the gain $K_2$ by a preset gain $K_3$.

12. The servo control device according to claim 10, wherein
the feed-forward controller is a feed-forward controller that generates the speed feed-forward signal $V_{F2}$ in accordance with $$V_{F2} = \frac{K_2}{Ts^2}(1-z^{-1})\Delta r + V_{FF} \quad \text{[Formula 6]}$$

where $\Delta r$ is the target command increment value, Ts a sampling period, $K_2$ a control gain, and $z^{-1}$ a delay corresponding to one sampling period.

13. The servo control device according to claim 11, wherein
the feed-forward controller is a feed-forward controller that generates the speed feed-forward signal $V_{F2}$ in accordance with $$V_{F2} = \frac{K_2}{Ts^2}(1-z^{-1})\Delta r + V_{FF} \quad \text{[Formula 7]}$$

where $\Delta r$ is the target command increment value, Ts a sampling period, $K_2$ a control gain, and $z^{-1}$ a delay corresponding to one sampling period, and
when the target command increment value is equal to or below a preset threshold at deceleration, generates a speed feed-forward signal $V_{F2}$ in accordance with the expression $$V_{F2} = V_{FF} \text{ or } V_{F2} = \frac{K_2 K_3}{Ts^2}(1-z^{-1})\Delta r + V_{FF} \quad \text{[Formula 8]}$$

where $K_3$ is a gain.

14. The servo control device according to claim 10 or 11, wherein
the position controller is a predictive controller for inputting the target command increment value $\Delta r(i+M)$ at an M sampling future and the position output increment value $\Delta r(i-K)$ before K ($K \geq 0$) sampling at the current time I, and outputting a speed command u(i) that minimizes the evaluation function $$J = \sum_{m=1}^{M} w_m \{e^*(i+m) + \alpha e(i-K)\}^2 + c\{u(i)\}^2 + c_d\{\Delta u(i)\}^2 \quad \text{[Formula 9]}$$

will be minimum, wherein $e^*(i+m)$ is a deviation predicted value at an m sampling future time, $w_m$, $\alpha$ are coefficients to multiply a deviation by, c and $c_d$ are coefficients to multiply a speed command u(i) and its increment value $\Delta u(i)$.

15. The servo control device according to claim 10 or 11, wherein
the position controller has a transfer function characteristic that $$u = \frac{V_{sum} - \frac{ffv}{Ts}X(z) + \frac{E}{1-z^{-1}}}{1+G(z)}\Delta r - \frac{\frac{E}{1-z^{-1}} + P_0}{1+G(z)}\Delta y \quad \text{[Formula 10]}$$

where u is the speed command, $\Delta y$ the position output increment value, E a control parameter, ffv a feed-forward gain, and $V_{sum}$, G(z), X(z), $P_0$ are respectively $$V_{sum} = \frac{v_{sum}}{Kgv(1+C_D)} \quad \text{[Formula 11]}$$

-continued $$G(z) = \frac{(g_1^* - C_D)z^{-1}}{1+C_D}$$

$$X(z) = \frac{1 + g_1^* \cdot z^{-1}}{1+C_D}$$

$$P_0 = \frac{-1 - g_1^* + Ts \cdot v_{sum}}{Kgv \cdot Ts(1+C_D)}$$

where $g_1^*$, $v_{sum}$, $C_D$ are control parameters, $K_{gv}$ is a constant gain from a speed command to a speed feedback.

16. The servo control device according to claim 15, wherein
the speed controller is an I-P controller, and
the feed-forward signal $V_{FF}$ in the feed-forward controller is given from a feed-forward gain ffv by $V_{FF}=\text{ffv}/Ts\cdot\Delta r$, that the feed-forward gain ffv is given by $$ffv = \frac{D \cdot Ti(1+g1^*)^2(Ti-2Ts)}{J \cdot Kv\{Ti^2(1+g1^*)^2 + C_D \cdot Ti \cdot Ts(1+g1^*) + C_D \cdot Ts^2(C_D - g1^*)\}} + \quad \text{[Formula 12]}$$

$$\frac{(J\{(1+g1^*)^2 Kv \cdot Ti^2 + Kv \cdot Ts^2(C_D - g1^*)^2 - Ti(1+g1^*)}{J \cdot Kv\{Ti^2(1+g1^*)^2 + C_D \cdot Ti \cdot Ts(1+g1^*) + C_D \cdot Ts^2(C_D - g1^*)\}}$$

where D is a viscous friction coefficient, J motor inertia, $T_i$ a speed loop integration time in the speed controller, and $K_v$ a speed loop gain in the speed controller, and
$K_2$ as a control gain is given by $$K_2 = \quad \text{[Formula 13]}$$

$$Ti(1-ffv) + \frac{Ts}{1+g_1^*}\{C_D(1-ffv) - g_1^*\} + \frac{D \cdot Ti}{J \cdot Kv}$$

17. The servo control device according to claim 15, wherein
the speed controller is a PI controller,
the speed feed-forward signal $V_{FF}$ in the feed-forward controller is given from a feed-forward gain ffv by $V_{FF}=\text{ffv}/Ts\cdot\Delta r$,
the feed-forward gain ffv is given by $$ffv = \frac{D \cdot Ti(1+g1^*)^2(Ti-2Ts) - J\{(1+g1^*)^2 Ti - Kv \cdot Ts^2(C_D - g1^*)^2\}}{J \cdot Kv \cdot Ts^2 \cdot C_D(C_D - g1^*)} \quad \text{[Formula 14]}$$

where D is a viscous friction coefficient, J motor inertia, $T_i$ a speed loop integration time in the speed controller, and $K_v$ a speed loop gain in the speed controller, and
$K_2$ as a control gain is given by $$K_2 = \frac{Ts}{1+g_1^*}\{C_D(1-ffv) - g_1^*\} + \frac{D \cdot Ti}{J \cdot Kv}. \quad \text{[Formula 15]}$$

* * * * *